United States Patent
Meier

(10) Patent No.: US 9,574,651 B2
(45) Date of Patent: Feb. 21, 2017

(54) LIGHTWEIGHT CAMSHAFT AND METHOD FOR PRODUCING THE SAME

(71) Applicant: Alex Meier, Triesen (LI)

(72) Inventor: Alex Meier, Triesen (LI)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 0 days.

(21) Appl. No.: 14/526,491

(22) Filed: Oct. 28, 2014

(65) Prior Publication Data
US 2015/0114169 A1    Apr. 30, 2015

(30) Foreign Application Priority Data
Oct. 28, 2013   (DE) .................. 10 2013 111 837

(51) Int. Cl.
*F16H 53/02*    (2006.01)

(52) U.S. Cl.
CPC ........ F16H 53/025 (2013.01); *Y10T 29/49293* (2015.01); *Y10T 74/2101* (2015.01)

(58) Field of Classification Search
CPC .......... B23P 11/00; B23P 23/00; B23P 11/005; B23P 19/04; B23P 2700/02; B23P 2700/07; B29C 66/131; B29C 66/474; B29L 2031/737; F01L 1/047; F16D 1/072; F16D 1/068; F16H 53/025; Y10T 29/49293; Y10T 29/4994; Y10T 29/51; Y10T 29/5191; Y10T 403/68; Y10T 403/4966; Y10T 403/703; Y10T 74/2101; F16C 3/02; F16C 3/026; F16C 3/04; F16C 3/06; F16C 3/10

See application file for complete search history.

(56) References Cited

U.S. PATENT DOCUMENTS

| 4,214,932 A * | 7/1980 | Van Auken ............ B65H 81/06 138/141 |
| 4,238,539 A * | 12/1980 | Yates ...................... B29C 70/32 156/172 |

(Continued)

FOREIGN PATENT DOCUMENTS

| DE | WO2004053553 | * | 7/2004 | ............. B29C 70/86 |
| DE | 10260115 B4 | | 1/2005 | |

(Continued)

OTHER PUBLICATIONS

EPO machine translation of WO2004056553, dated Mar. 7, 2016.*

(Continued)

*Primary Examiner* — Jason L Vaughan
(74) *Attorney, Agent, or Firm* — thyssenkrupp North America, Inc.

(57) ABSTRACT

The present disclosure relates to a lightweight camshaft and method for producing the same. The method includes the steps of slidably arranging a plurality of support elements onto a support tube, winding the support tube and support elements with at least one fiber layer, impregnating the at least one fiber layer with a matrix material so as to form a fiber composite, curing the fiber composite, and slidably arranging each of a plurality of functional elements, including at least a plurality of cam elements, onto a corresponding support element, such that the support elements are fixedly seated at least partially inside a passage defined through the functional elements.

11 Claims, 4 Drawing Sheets

(56) References Cited

U.S. PATENT DOCUMENTS

| | | | | |
|---|---|---|---|---|
| 4,238,540 | A | * | 12/1980 | Yates ..................... F16C 3/026 <br> 156/172 |
| 4,248,062 | A | * | 2/1981 | McLain ............... B29C 70/085 <br> 138/130 |
| 4,279,275 | A | * | 7/1981 | Stanwood ............. B29C 70/86 <br> 138/109 |
| 4,597,365 | A | * | 7/1986 | Madaffer ................ F01L 1/047 <br> 123/90.6 |
| 4,798,178 | A | * | 1/1989 | Greulich .............. F16H 53/025 <br> 123/90.6 |
| 4,809,562 | A | * | 3/1989 | Bendoraitas ............ F01L 1/047 <br> 123/90.6 |
| 4,993,282 | A | * | 2/1991 | Swars .................. B21D 53/845 <br> 123/90.6 |
| 5,085,099 | A | * | 2/1992 | Hughes ................ F16H 53/025 <br> 123/90.6 |
| 5,157,832 | A | * | 10/1992 | Hughes ................ F16H 53/025 <br> 29/6.01 |
| 5,201,246 | A | * | 4/1993 | Arnold ................... F01L 1/047 <br> 123/90.6 |
| 5,664,463 | A | * | 9/1997 | Amborn ............... B21D 53/845 <br> 123/90.6 |
| 5,850,695 | A | * | 12/1998 | Klaas ................... B21D 53/845 <br> 29/525 |
| 6,182,361 | B1 | * | 2/2001 | Cox ..................... B23K 11/002 <br> 29/523 |
| 7,020,962 | B2 | * | 4/2006 | Merz .................... B21D 53/845 <br> 123/90.6 |
| 8,474,136 | B2 | * | 7/2013 | Bechtold ................ B23P 15/00 <br> 29/458 |
| 8,807,106 | B2 | * | 8/2014 | Johnson ................ B22D 19/00 <br> 123/90.1 |

FOREIGN PATENT DOCUMENTS

| | | |
|---|---|---|
| DE | 10 2007 023 087 A1 | 3/2008 |
| DE | 10 2007 051 517 A1 | 4/2009 |
| DE | 10 2009 002 232 A1 | 10/2009 |
| DE | 10 2009 018 413 A1 | 10/2010 |
| DE | 10 2009 037 128 A1 | 2/2011 |
| EP | 1 044 318 B1 | 5/2003 |

OTHER PUBLICATIONS

English machine translation of the specification and claims of DE 10260115 B4.
English language Abstract of EP 1 044 318 B1 listed above.
English language Abstract of DE 10 2009 002 232 A1 listed above.
English language Abstract of DE 10 2009 037 128 A1 listed above.
English language Abstract of DE 10 2007 051 517 A1 listed above.
English language Abstract of DE 10 2009 018 413 A1 listed above.
English language Abstract of DE 10 2007 023 087 A1 listed above.
Edumero—Arnulf Betzold Gmbh: Puzzle Formensteckspiel http://www.edumero.de/puzzle-formensteckspiel/p57720.html?campaign=ppc/ebaycommercenetwork+inventoryInformation [online].

* cited by examiner

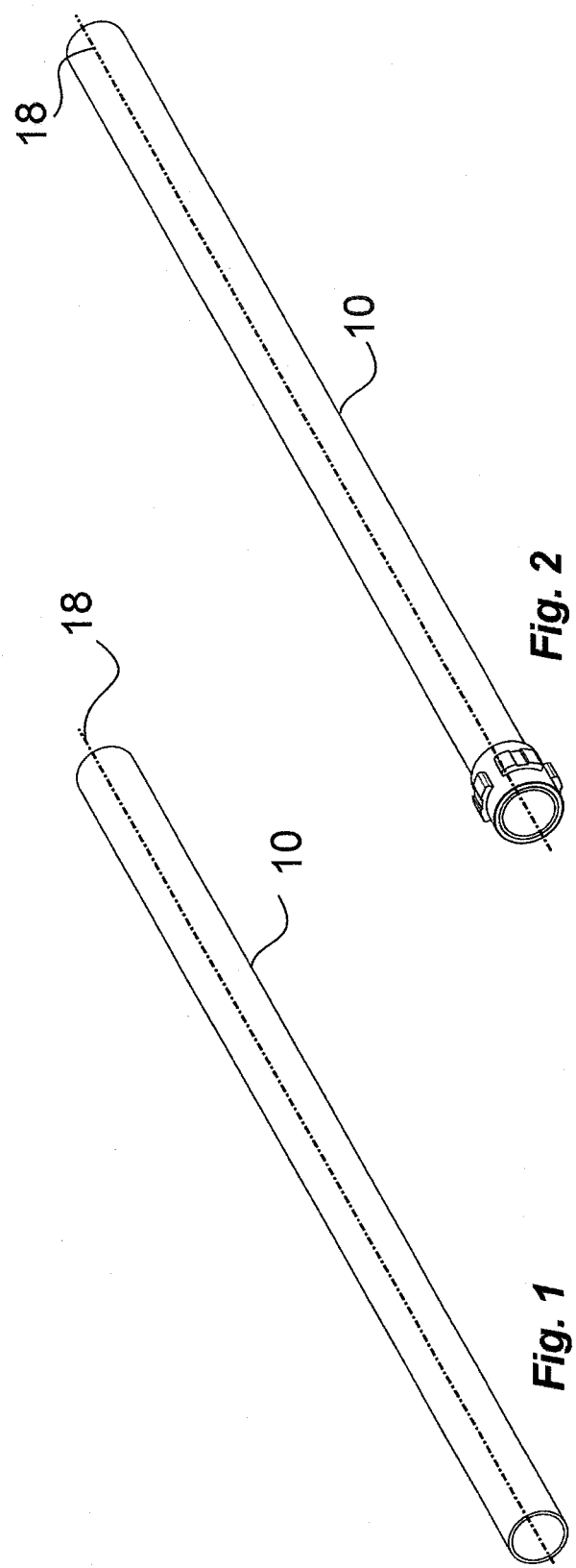

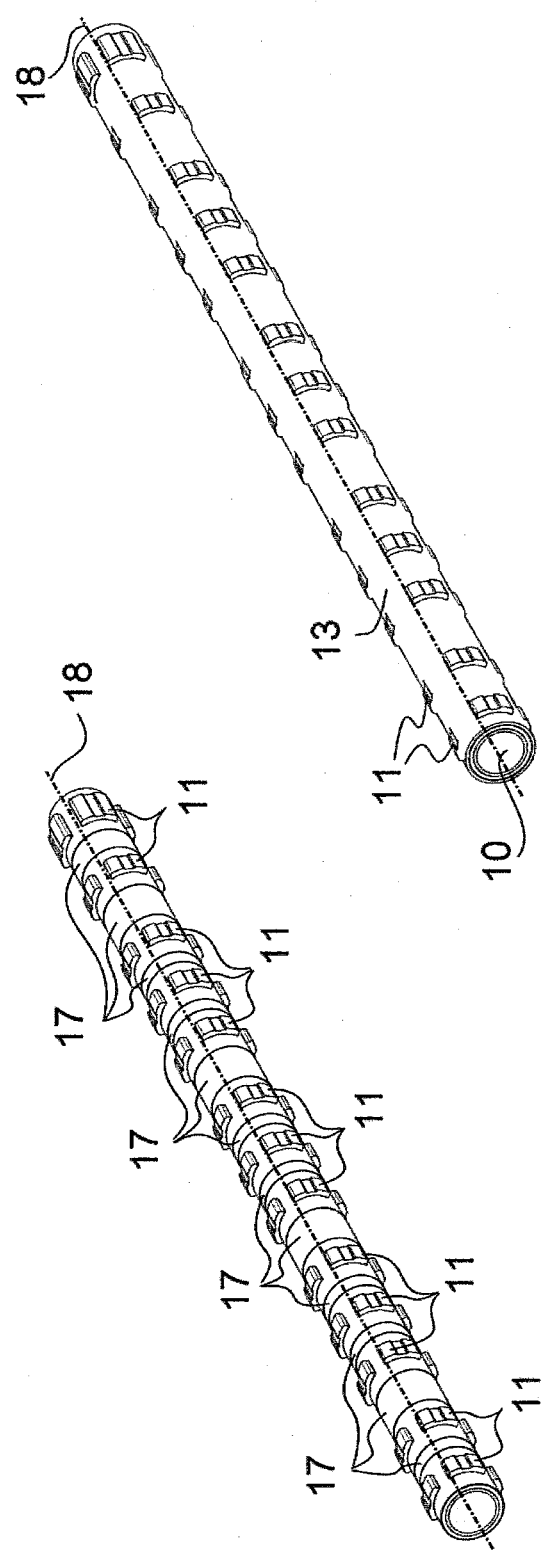

US 9,574,651 B2

LIGHTWEIGHT CAMSHAFT AND METHOD FOR PRODUCING THE SAME

FIELD

The present disclosure is related to a lightweight camshaft and a method for producing the same.

BACKGROUND

Existing solutions for lightweight camshafts have been attempted or contemplated in the past. German patent no. DE 102 60 115 B4 discloses a camshaft and method for producing the same, in which a tubular main body is produced from a carbon fiber composite material, into which tubular main body a plurality of metal sleeves for receiving cam elements are introduced. During the production of the main body, a corresponding number of metal sleeves are positioned at predefined points along the main body and laminated into the carbon fiber composite material.

In this manner, a lightweight camshaft may be produced, which lightweight camshaft comprises a tubular main body made from a carbon fiber composite material, metal sleeves connected to the main body, and cams seated on the metal sleeves. The metal sleeves are laminated into the carbon fiber composite material of the main body and serve a retaining function. The disadvantage of the camshaft and method disclosed in the German patent no. DE10260115 B4 is that the operational transmission forces between the metal sleeves that receive the cam elements and the carbon fiber composite material of the tubular main body can be high. High forces at the connection between the metal sleeves and the composite fiber material, which forces can often push the limits of the joint strength, result in the connection not having permanent strength, which strength is dependent, in particular, on the mechanical and thermal loading of the camshaft. The metal sleeves have a central passage, through which the inner part of the main body extends, the main body not forming a sufficient bedding module, depending on the use conditions of the camshaft, in order to produce a permanently loadable seat for the metal sleeves if the loading of the camshaft exceeds defined values.

A further disadvantage of the camshaft as disclosed in DE10260115 B4 is the fact that the main body is formed by a complicated winding process that requires the metal sleeves to be positioned onto the main body by way of a complicated method, in order to subsequently continue and complete the winding process. The accuracy with which the metal sleeves have to be positioned on the main body during the winding process has to be very high, since the position of the metal sleeves defines the later position of the cams.

SUMMARY

It is an object of the present disclosure to develop a method for producing a camshaft of lightweight design, which method can be carried out simply and makes it possible to produce a camshaft which can be subjected to high mechanical and thermal loadings.

In one aspect of the present disclosure, a method of manufacturing a lightweight camshaft includes: providing a support tube, coupling a plurality of support elements to the support tube, winding the support tube and support elements with at least one fiber layer, introducing a matrix material into the fiber layer so as to form a fiber composite, curing of the fiber composite, and placing functional elements, including at least a plurality of cam elements, on the support elements such that the support elements are seated in a passage through the functional elements and receive the functional elements in a retaining manner. In such an embodiment, the fiber composite comprises at least one fiber strand.

BRIEF DESCRIPTION OF THE DRAWINGS

The present invention is described in detail below with reference to the attached drawing figures, wherein:

FIG. 1 is a perspective view of an embodiment of a support tube of a lightweight camshaft of the present disclosure;

FIG. 2 is a perspective view of the support tube of FIG. 1 onto which a support element has been affixed;

FIG. 3 is a perspective view of an embodiment of a support tube having disposed thereon a plurality of support elements and spacer sleeves arranged between the support elements, as disclosed herein;

FIG. 4 is a perspective view of the support tube, support elements, and spacer sleeves of FIG. 3, onto which a fiber layer has been disposed prior to the application of a matrix material thereto, as disclosed herein;

DETAILED DESCRIPTION

Figure 6:
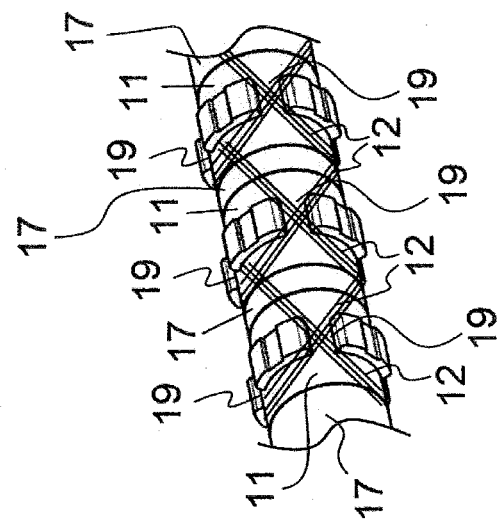
FIG. 6 is detail view of an embodiment of a plurality of support elements and spacer sleeves of the present disclosure onto which a fiber layer has been disposed, prior to the application of a matrix material thereto.

An embodiment of a method of manufacturing a lightweight camshaft according to the present disclosure comprises at least the following: providing a support tube, coupling a plurality of support elements to the support tube, winding the support tube and support elements with at least one fiber layer, introducing a matrix material into the fiber layer so as to form a fiber composite, curing of the fiber composite, and placing functional elements, including at least a plurality of cam elements, on the support elements such that the support elements are seated in a passage through the functional elements and receive the functional elements in a retaining manner. In such an embodiment, the fiber composite comprises at least one fiber strand.

Such a proposed method for producing a lightweight camshaft achieves the advantage that the winding of the support tube and support elements with the at least one fiber layer can be carried out independently from the step of providing the support tube. The support elements can be fixedly fastened on the support tube in a positionally accurate and mechanically loadable manner. A fiber composite can be formed by way of the subsequent introduction of a matrix material into the fiber layer. Subsequent curing of the fiber composite results in high strength support elements disposed on the support tube. Thereafter, functional elements, which may comprise cam elements, can be placed onto the support elements. The functional elements include a plurality of central passages defined there through, such that the functional elements are configured to be placed onto the support elements through the passages of the functional elements and retained on the support elements. The curing of the fiber composite can be brought about by way of hardening the fiber composite material, including for example by hardening at an elevated temperature.

In an alternate embodiment of the method, spacer sleeves can be coupled onto the support tube and disposed between the support elements. In one embodiment, a support element and a spacer sleeve can alternatingly be slidably disposed onto the support tube, with the spacer sleeves ensuring the geometrically necessary spacing of the support elements on the support tube along a direction of a longitudinal axis of the support tube. In an alternate embodiment, each of the support elements may be a single piece that incorporates one or more spacer sleeves therein, with the result that the spacer sleeves can be dispensed with as individual components.

If spacer sleeves and support elements are alternatingly slid onto, or coupled, to the support tube, the winding of the support tube with the at least one fiber layer can also incorporate the support elements within or beneath the windings. If spacer sleeves are used, they can likewise be incorporated within or beneath the fiber windings. In one exemplary embodiment, the winding of the support tube can take place in such a way that the fiber layers are laid completely on the support elements and/or on the spacer sleeves. In such an embodiment, the support elements, and optionally the spacer sleeves, have the fiber layers wound thereon, but the fiber layer is not actually applied onto the outer surface of the support tube itself. Thereafter, a matrix material, such as an epoxy resin, is applied to the fiber layers and cured. The curing of the fiber layer with the introduced matrix material produces a fiber composite that allows the support elements and optional spacer sleeves disposed on the support tube to become a rigid and mechanically loadable structure.

The support tube may be a tubular body made from a fiber composite material. In one embodiment, the support tube may be made from a carbon fiber composite material, but such embodiment should not be read to limit the scope of the shape or composition of the support tube. The tubular body may be provided in already completely cured form, in order to have the necessary strength which is required for the construction of a camshaft. During the application of the matrix material into the fiber layer, which in one embodiment occurs after the positioning of one or more of the support elements and spacer sleeves onto the support tube, the matrix material may also be applied to portions of the support tube. Such application on the support tube may be done, for example, to close any remaining gaps and/or cavities.

In one embodiment, the method of arranging of functional elements on the support elements can further comprise one or more of the following additional steps. Prior to coupling the functional elements to the support tube having a plurality of support elements disposed thereon, the functional elements are slidingly aligned with a longitudinal axis of the support tube and oriented to a first rotational angular position with respect to the support elements disposed on the support tube. In the first rotational angular position, the functional elements have sufficient clearance to pass over the support elements on the support tube. While oriented at the first rotational angular position about the longitudinal axis, each functional element is slidably placed onto, or disposed on, the support tube in the longitudinal direction and moved to a location along the support tube adjacent, but not on, its assigned support element. In most cases, this requires the functional elements to pass over one or more support elements to be positioned adjacent its assigned support element on the support tube. While disposed adjacent their respective assigned support elements, the functional elements are rotated about the longitudinal axis so as to be oriented at a second rotational angular position with respect to the support elements on the support tube. Each functional element is then pushed/forced onto its respective support element, which forms the final seating position for each functional element.

In some embodiments, the functional elements may be positively locked onto to the support elements, while in other embodiments the functional elements are seated on the support elements in a non-locking manner. As discussed above, when the functional elements are oriented at the first rotational angular position relative to the support elements, by way of an angular rotation of the functional elements about the longitudinal axis, the functional elements can be guided over the support elements on the support tube, without any contact or friction forces occurring between the functional elements and the support elements. Accordingly, there are no frictional forces, interference fits, or contact between the components that needs to be overcome to move a functional element over and past a support element to position it adjacent to its assigned support element prior to seating the functional element on its assigned support element. The functional elements can be guided on the camshaft, one after another according to their sequence, over the support tube and the affixed support elements, by the functional elements being oriented in the first angular position relative to the support elements, which therefore makes it possible to guide the functional elements over the support elements substantially without contact.

The support elements can have fiber grooves defined on an outer circumferential face thereof, and configured to permit the fibers of the fiber layer to be laid in the fiber grooves. The fibers of the fiber layer can be deposited with a fiber profile over the support elements and seated within the fiber grooves. In one embodiment, the fibers of the fiber layer will also be applied over the spacer sleeves at an angle, for example, at an angle of from about 40° to about 50°, or about 45°, with respect to the longitudinal axis. If fiber grooves are made in the outer circumferential face of the support elements, the fibers of the fiber layer do not protrude beyond the outer circumferential face of the support elements, with the result that the fiber layer does not impede the positioning of the functional elements onto the support elements a discussed above. In particular, the functional elements can be guided over the support elements in the corresponding first angular position, without the disruption of the mounting movement of the functional elements over the support elements occurring as a result of the fibers of the fiber layer.

In one embodiment, the support elements can further comprise retaining grooves defined in an outer circumferential face of the support elements. At the same time, the functional elements can further comprise a plurality of retaining springs, or retaining protrusions, disposed in the central passages of the functional elements, which retaining springs are complementary to the retaining grooves defined in the outer face of the support elements. In such embodiment, when the functional elements are oriented in the second rotational angular position relative to the support elements, and the functional elements are forced/pushed onto the support elements in the longitudinal axial direction, the retaining springs on the functional elements can be forced/pushed into the retaining grooves of the support elements, such as for example by the application of a clamping force between the functional elements and the support elements in the direction of the longitudinal axis. In such embodiment, with the functional elements in the second rotational angular position, the retaining grooves are aligned with the retaining springs so as to permit the functional elements to be forced/pushed onto the support elements in a retaining manner. The functional elements are rotated from the first to the second angular position just before the desired final seating, or mounting, position is reached along the length of the support tube, that is to say, just prior to reaching the appropriate assigned support element onto which that particular functional element is to finally be mounted.

The clamping/retaining force imparted between the support elements and the functional elements can be produced, for example, by virtue of the fact that one or more of the retaining springs and the retaining grooves have a ramp shaped lead-in extending in the axial direction, which ramp assists with the movement of the functional element onto the support element when the functional element is press fit onto the support element. When the functional elements are forced/pushed onto the support elements with the application of an axial compression force between the two components, the ramp shaped lead-in permits the retaining springs to slide into the retaining grooves, where the retaining springs and the retaining grooves impart a compressive radial force on each other, as by a typical press fit, thereby fixedly retaining the functional element on the support element. Here, the force required to push the functional element onto the support element can be applied by means of a corresponding tool, for example cam mounting tongs, only between the support element and the functional element. This prevents the relatively high force required to press-fit the functional element onto the support element from being introduced by the support element into the fiber composite or into the support tube.

The introduction of the matrix material into the at least one fiber layer can be performed in a mold, and may optionally be accomplished by use of a resin transfer molding method.

The functional elements can form cam elements, which are present multiple times on the support tube in order to form the lightweight camshaft. Furthermore, in alternate embodiments, the functional elements can also comprise, for example, a flange or bearing rings, and the flange can be placed onto an associated support element, in particular at an end of the support tube, and the bearing ring or the bearing rings can be pushed onto the support tube between the support elements or the spacer sleeves.

When the individual elements have been pushed onto the support tube, and the fiber composite body has been cured, a lightweight camshaft is produced which can be subjected to final machining by way of a machining method, for example by way of grinding. By way of a final grinding, a dimensional accuracy of the camshaft can be achieved which is no longer influenced by the position of the support elements on the support tube and by the fiber composite. Furthermore, undesirable geometric displacements and shifts can be caused during the production process, for example, by way of the introduction of the matrix material and/or by way of the curing of the fiber composite, which displacements and shifts can be ground out of the final camshaft by way of a final grinding of the cam elements or other functional elements.

Furthermore, the present disclosure is directed to a camshaft of lightweight design which has been produced by way of a method for producing a camshaft as disclosed above. Additional features and associated advantages disclosed in conjunction with a method as disclosed herein are likewise to be taken into consideration for a camshaft produced by a method as disclosed herein.

The support elements, the functional elements, in particular the cam elements and the bearing rings, can advantageously be configured as sintered parts. The spacer sleeves can preferably be configured from plastic, in particular from carbon fiber composite material.

Referring now to FIGS. 1, 2, 3 and 4, shown therein is a support tube 10 which extends along its longitudinal axis 18. FIG. 1 shows, by way of example, an isometric view of the support tube 10 produced from a fiber composite material, for example from a carbon fiber composite material.

FIG. 2 shows the support tube 10, onto which a first support element 11 has been pushed. In such embodiment, the support element 11 is pushed onto the support tube 10 along the direction of the longitudinal axis 18 of the support tube 10.

Finally, FIG. 3 shows a stage of the production method in which support elements 11 have alternatingly been pushed with spacer sleeves 17 onto the support tube 10 over the entire length of the support tube 10. In such embodiment, the spacer sleeves 17 ensure the required axial position of the support elements 11 along the support tube 10 in the direction of the longitudinal axis 18.

The support elements 11 and the spacer sleeves 17 can have central through passages which are dimensioned relative to the external diameter of the support tube 10 such that each of the support elements 11 and the spacer sleeves 17 can be seated on the support tube 10 substantially without play there between.

FIG. 4 shows the support tube 10 with the support elements 11 and the spacer sleeves (not visible) disposed thereon, and a fiber composite 13 applied over the support elements 11 and over the spacer sleeves 17. The application of the fiber composite 13 takes place by way of the application of a plurality of fiber layers, which are described in further detail in conjunction with FIG. 6, and impregnating the fiber layers with a matrix material. After curing the fiber impregnated matrix material, a fiber composite 13 is formed.

As a result of the fiber composite 13, the support elements 11 are seated fixedly on the support tube 10 and form a composite with one another which leads to stiffening of the support tube 10 with the fiber composite 13. By way of this stiffened arrangement of the support tube 10 with the support elements 11, the spacer sleeves 17 and the fiber composite 13, a minimum-weight receiving body for receiving a plurality of functional elements 14 is produced, in order to form the camshaft 1 according to FIG. 5.

Figure 5:
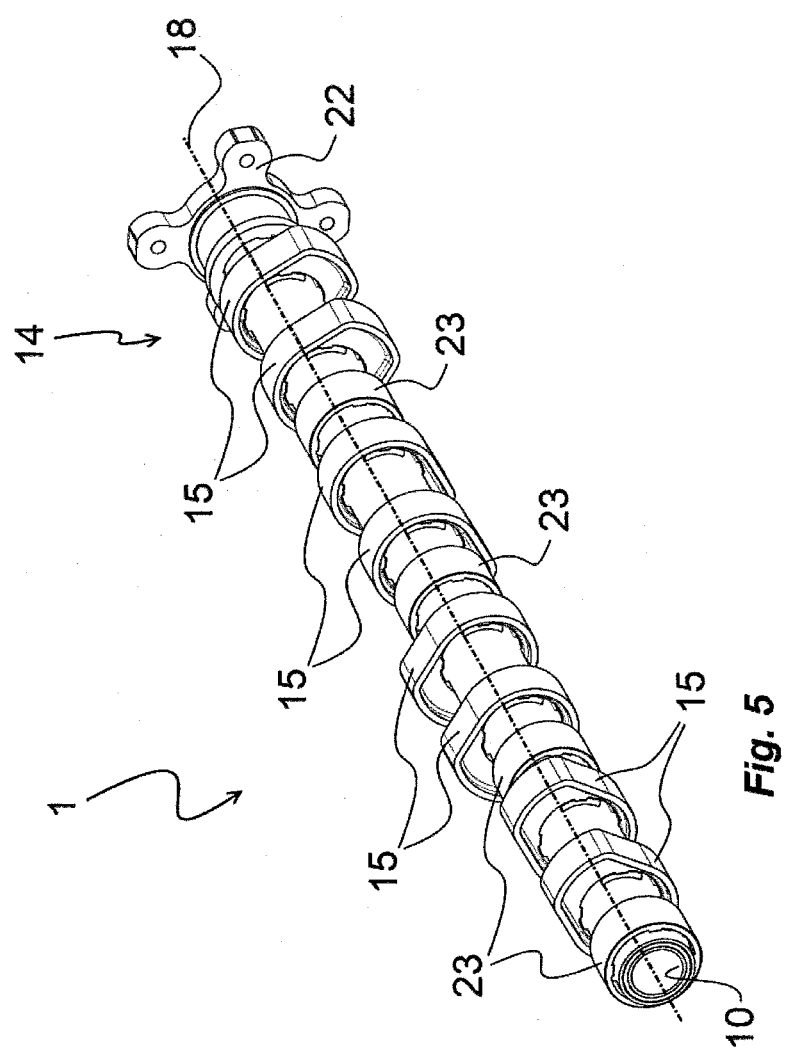
FIG. 5 is a perspective view of an embodiment of a lightweight camshaft of the present disclosure.

FIG. 5 shows a camshaft 1 with a plurality of functional elements 14 disposed thereon. The functional elements 14 substantially comprise a plurality of cam elements 15, a flange 22 and bearing rings 23, which likewise are functional elements 14 in the context of the present disclosure.

Each of the functional elements 14 are pushed onto respectively associated support elements 11, which are embedded in the fiber composite 13. The support tube 10 extends along the longitudinal axis 18 through the fiber composite 13 with the surrounding support elements 11 and spacer sleeves (not shown).

FIG. 6 shows a detail section of the support tube 10 onto which a plurality of support elements 11 and spacer sleeves 17 have alternatingly been affixed. The support elements 11 have a sleeve-shaped main body which preferably has an external diameter substantially equal to an external diameter of the spacer sleeves 17. Each of support elements 11 has a sleeve shaped main body with a plurality of molded circumferential projections disposed on and extending from an outer surface thereof, which projections are separated by a plurality of fiber grooves 19 defined there between.

In an embodiment of the present disclosure, a fiber layer 12 is wound over the support elements 11 and the spacer sleeves 17, with the fibers of the fiber layer 12 running through the fiber grooves 19 defined between the molded projections of the support elements 11. In this way, the fibers of the fiber layer 12 can run on the outer circumferential face of the spacer sleeves 17 and on the outer circumferential face of the sleeve-shaped main bodies of the support elements 11, without the fibers of the fiber layer 12 having to overcome jumps in diameter. Here, the fiber layer 12 comprises at least one fiber strand which is wound onto the elements over the support tube so as to run through the fiber grooves 19 of the support elements 11 by means of a corresponding winding apparatus. In one embodiment, the fiber strand can therefore be formed from one-dimensional individual fibers which are thereafter impregnated with a matrix material.

Figure 8:
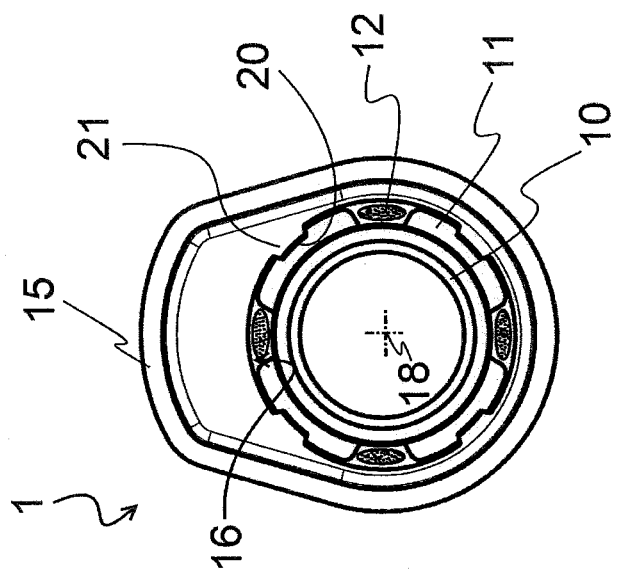
FIG. 8 is an end view of the support tube of FIG. 7 with a functional element fixedly coupled onto a support element, as disclosed herein.
Figure 7:
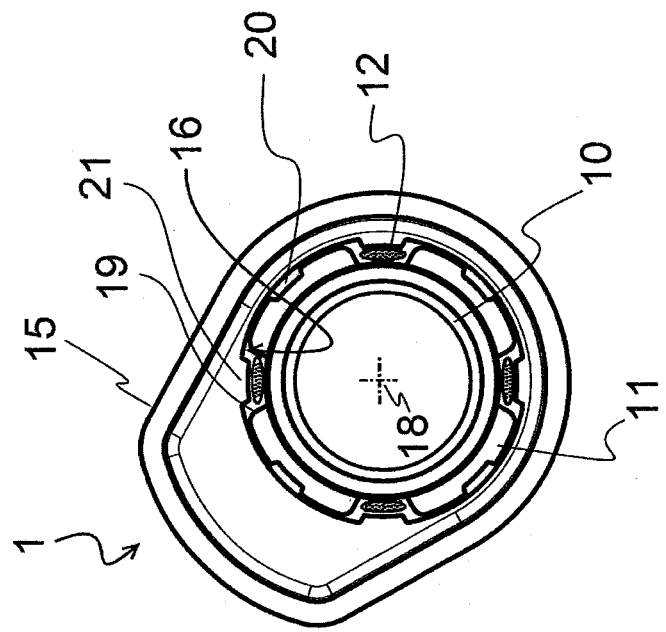
FIG. 7 is an end view of an embodiment of the support tube of the present disclosure on which a support element is disposed, and over which support element a functional element is guided at an angular position.

FIGS. 7 and 8 in each case show a view of the camshaft 1 from the direction of the longitudinal axis 18. The view shows the support tube 10, on which a support element 11 is applied. The support element 11 has molded projections, between which retaining grooves 20 are defined. The cam elements 15 have a passage 16 defined there through, with retaining springs 21 disposed at an inner wall of the passage 16.

FIG. 7 shows the arrangement of the cam element 15 over the support element 11 in a first angular position, in which the retaining springs 21 on the cam element 15 are aligned with and passing into the fiber grooves 19 defined in the support element 11 that receive the fiber layer 12. The fiber grooves 19 are deeper and larger than the retaining grooves 20 in the support element 11, such that the cam element 15 can be guided over the support element 11 with clearance between the cam element 15 and the support element 11, and without any a clamping forces being imparted there between When, however, the cam element 15 is situated adjacent to and in front of, in an axial direction, a support element 11 onto which it is to be finally seated, the cam element 15 can be rotated about the longitudinal axis to a second angular position, as shown in FIG. 8. In this second angular position, the retaining grooves 20 of the support element 11 are aligned with, in terms of their rotational position, the retaining springs 21 in the through passage 16 of the cam element 15. If the cam element 15 is pressed/forced in an axial direction onto the support element 11 while in the second angular position, the retaining springs 21 are forced into the retaining grooves 20, resulting in a compressive press-fit clamping force applied there between which serves to retain the cam element 15 on the support element 11. The magnitude of the pressing force required to push the cam element 15 onto the support element 11 with the engagement of the retaining springs 21 into the retaining grooves 20 can be so great that the clamping action which is produced also withstands the operating forces of the camshaft 1.

The mounting techniques disclosed herein, namely the utilization of different angular positions to guide the cam element 15 over support elements 11 which are positioned in front of it and to push the cam element 15 onto the associated support element 11, can also be used with alternate types of functional elements 14 in the context of the present disclosure. In particular, the flange 22 or the bearing rings 23 can also be applied to the respectively associated support elements 11 in the manner disclosed herein.

The present disclosure is not restricted to a preferred exemplary embodiment specified in the preceding text. Rather, a number of alternate embodiments are conceivable which use the solution disclosed, even in the case of embodiments of fundamentally different type. All the features and/or advantages which are apparent from the claims, the description or the drawings, including structural details or spatial arrangements, can be advantageous to the invention either alone or in a very wide variety of combinations.

What is claimed is:

1. A method for producing a camshaft, comprising:
   slidably arranging a plurality of support elements onto a support tube in a predefined arrangement;
   winding at least one fiber layer onto the combined support tube and plurality of support elements;
   impregnating the at least one fiber layer with a matrix material so as to form a fiber composite;
   curing the fiber composite so as to embed the supporting elements therein; and
   slidably arranging each of a plurality of functional elements, including at least a plurality of cam elements, onto a corresponding support element, such that the support elements are fixedly seated at least partially inside a passage defined through the functional elements, wherein slidably arranging the functional elements comprises:
   sliding the functional elements over the combined support tube and support element embedded fiber composite, while the functional elements are oriented in a first rotational angular position with respect to the support elements,
   rotating the functional elements about a longitudinal axis of the support tube to a second rotational angular position,
   forcing, in an axial direction, one or more of the functional elements onto a support element to a locked seating position thereon.

2. The method of claim 1, further comprising slidably arranging a plurality of spacer sleeves onto the support tube, with a spacer sleeve disposed between each of two consecutive support elements on the support tube.

3. The method of claim 1, wherein the tubular body is made from a fiber composite material.

4. The method of claim 1, wherein the tubular body is made from a carbon fiber composite material.

5. The method of claim 1, wherein the support elements define a plurality of fiber grooves disposed in an outer circumferential face of the support elements.

6. The method of claim 1, wherein said winding step further includes winding at least one fiber from the fiber layer into the fiber grooves in the support elements.

7. The method of claim 1, wherein one or more of the plurality of support elements includes a plurality of retaining grooves defined in an outer circumferential face thereof, one or more of the plurality of functional elements includes a plurality of retaining springs disposed in the passage defined there through, wherein the method further comprises forcing the retaining springs from at least a first functional element into the retaining grooves of a first support element by an axial movement of the first functional element with respect to the first support element, when the first functional element is pushed onto the first support element.

8. The method of claim 1, wherein said winding step includes winding a fiber of the fiber layer over the support elements in the fiber grooves and over a plurality of spacer sleeves at an angle of between about 40° to about 50° with respect to a longitudinal axis of the support tube.

9. The method of claim 1, wherein the step of impregnating the at least one fiber layer with a matrix material is performed by a mold.

10. The method of claim 1, wherein the plurality of functional elements includes at least one flange and at least one bearing ring, the method further comprising:
    placing the flange onto a support element that has been slidably arranged at a first end of the support tube,
    slidably arranging a plurality of bearing rings onto the support tube, such that a bearing ring is disposed on the support tube between each of a support element and an adjacent spacer sleeve.

11. The method of claim 1, further comprising, after slidably arranging each of a plurality of functional elements, including at least a plurality of cam elements, onto a corresponding support element, machining one or more of the cam elements.

\* \* \* \* \*